United States Patent [19]
Vorbach et al.

[11] Patent Number: 6,081,903
[45] Date of Patent: Jun. 27, 2000

[54] METHOD OF THE SELF-SYNCHRONIZATION OF CONFIGURABLE ELEMENTS OF A PROGRAMMABLE UNIT

[75] Inventors: Martin Vorbach; Robert Münch, both of Karlsruhe, Germany

[73] Assignee: PACT GmbH, Munich, Germany

[21] Appl. No.: 08/946,812

[22] Filed: Oct. 8, 1997

[30] Foreign Application Priority Data

Feb. 8, 1997 [DE] Germany .......................... 197 04 728

[51] Int. Cl.⁷ ................................................. G06F 1/12
[52] U.S. Cl. ........................................ 713/400; 708/232
[58] Field of Search ................................. 713/400, 401, 713/1, 100; 395/551, 552; 708/232; 364/488, 489, 490

[56] References Cited

U.S. PATENT DOCUMENTS

| | | |
|---|---|---|
| Re. 34,363 | 8/1993 | Freeman . |
| 4,706,216 | 11/1987 | Carter . |
| 4,739,474 | 4/1988 | Holsztynski et al. . |
| 4,761,755 | 8/1988 | Ardini et al. . |
| 4,811,214 | 3/1989 | Nosenchuck et al. . |
| 4,870,302 | 9/1989 | Freeman . |
| 4,901,268 | 2/1990 | Judd . |
| 4,967,340 | 10/1990 | Dawes . |

(List continued on next page.)

FOREIGN PATENT DOCUMENTS

| | | |
|---|---|---|
| 0 221 360 | 5/1987 | European Pat. Off. . |
| 0428327A1 | 5/1991 | European Pat. Off. . |
| 748 051 A2 | 12/1991 | European Pat. Off. . |
| 0539595A1 | 5/1993 | European Pat. Off. . |
| 0 678 985 | 10/1995 | European Pat. Off. . |
| 0 726 532 | 8/1996 | European Pat. Off. . |
| 735 685 | 10/1996 | European Pat. Off. . |
| 4416881 | 11/1994 | Germany . |
| WO90/11648 | 10/1990 | WIPO . |
| 94/08399 | 4/1994 | WIPO . |

OTHER PUBLICATIONS

Villasenor, John, et al., "Configurable Computing." *Scientific American*, vol. 276, No. 6, Jun. 1997, pp. 66–71.

Villasenor, John, et al., "Configurable Computing Solutions for Automatic Target Recognition," *IEEE*, 1996 pp. 70–79.

Tau, Edward, et al., "A First Generation DPGA Implementation," *FPD '95*, pp. 138–143.

Athanas, Peter, et al., "IEEE Symposium on FPGAs For Custom Computing Machines," *IEEE Computer Society Press*, Apr. 19–21, 1995, pp. i–vii, 1–222.

Bittner, Ray, A., Jr., "Wormhole Run–Time Reconfiguration: Conceptualization and VLSI Design of a High Performance Computing system," *Dissertation*, Jan. 23, 1997, pp. i–xx, 1–415.

Myers, G., Advances in Computer Architecture, Wiley–Interscience Publication, 2nd ed., John Wiley & Sons, Inc. pp. 463–494, 1978.

M. Saleeba, "A Self–Contained Dynamically Reconfigurable Processor Architecture", Sixteenth Australian Computer Science Conference, ASCS–16, QLD, Australia, Feb., 1993.

M. Morris Mano, "Digital Design, " by Prentice Hall, Inc., Englewood Cliffs, New Jersey 07632, 1984, pp. 119–125, 154–161.

Maxfield, C. "Logic that Mutates While–U–Wait" EDN (Bur. Ed) (USA), EDN (European Edition), Nov. 7, 1996, Cahners Publishing, USA.

*Primary Examiner*—Dennis M. Butler
*Attorney, Agent, or Firm*—Kenyon & Kenyon

[57] ABSTRACT

A method of synchronizing and reconfiguring configurable elements in a programmable unit is provided. A unit has a two or multi-dimensional programmable cell architecture (e.g., DFP, DPGA, etc.), and any configurable element can have access to a configuration register and a status register of the other configurable elements via an interconnection architecture and can thus have an active influence on their function and operation. By making synchronization the responsibility of each element, more synchronization tasks can be performed at the same time because independent elements no longer interfere with each other in accessing a central synchronization instance.

16 Claims, 2 Drawing Sheets

U.S. PATENT DOCUMENTS

| | | |
|---|---|---|
| 5,014,193 | 5/1991 | Garner et al. . |
| 5,015,884 | 5/1991 | Agrawal et al. . |
| 5,021,947 | 6/1991 | Campbell et al. . |
| 5,023,775 | 6/1991 | Poret . |
| 5,081,375 | 1/1992 | Pickett et al. . |
| 5,109,503 | 4/1992 | Cruickshank et al. . |
| 5,123,109 | 6/1992 | Hillis . |
| 5,125,801 | 6/1992 | Nabity et al. . |
| 5,128,559 | 7/1992 | Steele . |
| 5,142,469 | 8/1992 | Weisenborn . |
| 5,204,935 | 4/1993 | Mihara et al. . |
| 5,208,491 | 5/1993 | Ebeling et al. . |
| 5,223,539 | 6/1993 | Agrawal et al. . |
| 5,226,122 | 7/1993 | Thayer et al. . |
| 5,247,689 | 9/1993 | Ewert . |
| 5,287,472 | 2/1994 | Horst . |
| 5,301,344 | 4/1994 | Kolchinsky . |
| 5,303,172 | 4/1994 | Magar et al. . |
| 5,336,950 | 8/1994 | Popli et al. . |
| 5,361,373 | 11/1994 | Gilson . |
| 5,418,952 | 5/1995 | Morley et al. . |
| 5,421,019 | 5/1995 | Holsztynski et al. . |
| 5,422,823 | 6/1995 | Agrawal et al. . |
| 5,426,378 | 6/1995 | Ong . |
| 5,430,687 | 7/1995 | Hung et al. . |
| 5,440,245 | 8/1995 | Galbraith et al. . |
| 5,442,790 | 8/1995 | Nosenchuck . |
| 5,444,394 | 8/1995 | Watson et al. . |
| 5,448,186 | 9/1995 | Kawata . |
| 5,455,525 | 10/1995 | Ho et al. . |
| 5,457,644 | 10/1995 | McCollum et al. . |
| 5,473,266 | 12/1995 | Ahanin et al. . |
| 5,473,267 | 12/1995 | Stansfield . |
| 5,475,583 | 12/1995 | Bock et al. . |
| 5,475,803 | 12/1995 | Stearns et al. . |
| 5,483,620 | 1/1996 | Pechanek et al. . |
| 5,485,103 | 1/1996 | Pedersen et al. . |
| 5,485,104 | 1/1996 | Agrawal et al. . |
| 5,489,857 | 2/1996 | Agrawal et al. . |
| 5,491,353 | 2/1996 | Kean . |
| 5,493,239 | 2/1996 | Zlotnick . |
| 5,497,498 | 3/1996 | Taylor . |
| 5,506,998 | 4/1996 | Kato et al. . |
| 5,510,730 | 4/1996 | El Gamal et al. . |
| 5,511,173 | 4/1996 | Yamaura et al. . |
| 5,513,366 | 4/1996 | Agarwal et al. . |
| 5,521,837 | 5/1996 | Frankle et al. . |
| 5,522,083 | 5/1996 | Gove et al. . |
| 5,532,693 | 7/1996 | Winters et al. . |
| 5,532,957 | 7/1996 | Malhi . |
| 5,535,406 | 7/1996 | Kolchinsky . |
| 5,537,057 | 7/1996 | Leong et al. . |
| 5,537,601 | 7/1996 | Kimura et al. . |
| 5,541,530 | 7/1996 | Cliff et al. . |
| 5,544,336 | 8/1996 | Kato et al. . |
| 5,548,773 | 8/1996 | Kemney et al. . |
| 5,555,434 | 9/1996 | Carlstedt . |
| 5,559,450 | 9/1996 | Ngai et al. . |
| 5,561,738 | 10/1996 | Kinerk et al. . |
| 5,570,040 | 10/1996 | Lytle et al. . |
| 5,583,450 | 12/1996 | Trimberger et al. . |
| 5,586,044 | 12/1996 | Agrawal et al. . |
| 5,587,921 | 12/1996 | Agrawal et al. . |
| 5,588,152 | 12/1996 | Dapp et al. . |
| 5,590,345 | 12/1996 | Barker et al. . |
| 5,778,439 | 7/1998 | Trimberger et al. ............ 711/153 |
| 5,867,691 | 2/1999 | Shiraishi ....................... 395/551- |

METHOD OF THE SELF-SYNCHRONIZATION OF CONFIGURABLE ELEMENTS OF A PROGRAMMABLE UNIT

BACKGROUND OF THE INVENTION

1. State of the art
2. Problems

With the units of today (FPGAs, DPGAs, etc.), synchronization of the configurable elements is usually based on the clock pulse of the unit. This type of time-controlled synchronization poses many problems, because it is often not known in advance how much time a task will require until a final result is available. Another problem with time-controlled synchronization is that the event upon which the synchronization occurs is not triggered by the element to be synchronized itself but instead by an independent element. In this case, two different elements are involved in the synchronization. This leads to much higher management overhead.

3. Improvement through the invention

This invention describes a method which makes it possible for the synchronization to be based on the elements to be synchronized themselves. Synchronization is no longer implemented or administered by a central instance. By making synchronization the responsibility of each element, many more synchronization tasks can be carried out at the same time, because independent elements no longer interfere with each other in accessing the central synchronization instance. The patent claims concern details and specific embodiments as well as features of the synchronization method according to this invention.

DESCRIPTION OF THE INVENTION

Overview of the invention; abstract

In a unit with a two- or multi-dimensional, programmable cell architecture (DFP, DPGA), any configurable element can have access to the configuration and status register of the other configurable elements via an interconnection architecture and can thus have an active influence on their function and operation. Thus, in addition to the usual method, the configuration may also take place from the processing array (PA, see PACT02) through a primary logic unit.

DETAILED DESCRIPTION OF THE INVENTION

Figure 1:
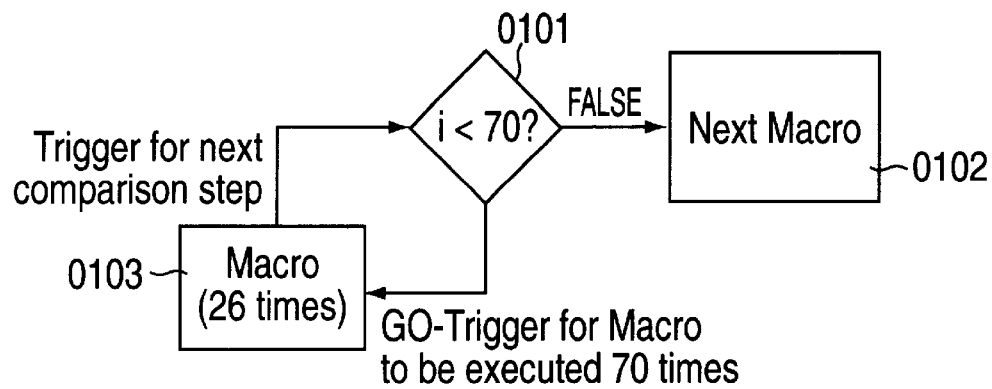

The invention starts with a run-time programmable, run-time reconfigurable unit. The configurable elements on the chip have one or more configuration registers for different tasks. Read and write access to these configuration registers is possible. In the method described here, it is assumed that for the following information, a configuration can be set in an element to be configured.

Interconnection register. The type of connection with other cells is set in this register.

Command register. The function to be carried out by the configurable element is entered in this register.

Status register. The cell stores its current status in this register. This status provides information to the other elements of the component regarding which processing cycle the cell is in.

A cell is configured by a command which determines the function of the cell that is to be carried out. In addition, configuration data are entered to set the interconnection with other cells and the contents of the status register. The cell is ready for operation after this procedure.

To permit a flexible and dynamic interaction of multiple cells, each cell can have read or write access to all the configuration registers of another cell. The type of command with which the cell has been configured specifies to which of the many configuration registers will allow read or write access. Each command that can be executed by the cell exists in as many different modes of address as there are different independent configuration registers in an element to be configured.

Example: One cell has the configuration registers indicated above (interconnection, command and status) and is to execute the command ADD which performs addition. Through the various types of ADD command, it is now possible to select where the result of this function is to be transferred.

ADD-A. The result is transmitted to operand register A of the target cell.

ADD-B. The result is transmitted to operand register B of the target cell.

ADD-V. The result is transmitted to the interconnect register of the target cell.

ADD-S. The result is transmitted to the status register of the target cell.

ADD-C. The result is transmitted to the command register of the target cell.

In addition to the result, each cell can generate a number of trigger signals. The trigger signals need not necessarily be transmitted to the same target cell as the result of processing the configured command. One trigger signal or a combination of multiple trigger signals triggers a certain action in the target cell or puts the cell in a certain status. A description of the states can be found in the following text. There are the following trigger signals:

GO trigger. The GO trigger puts the target cell in the READY status.

RECONFIG trigger. The RECONFIG trigger sets the target cell in the RECONFIG status, so that the cell can be reprogrammed. This trigger is very appropriate especially in conjunction with switching tables. If it is assumed that the data to be processed is loaded into the operand registers at the rising edge of the clock pulse, processed in the period of the H level, and written to the output register at the trailing edge, then reconfiguration of the cell is possible at the trailing edge. The new configuration data is written to the command register at the trailing edge. The period of the L level is sufficient to successfully conclude the reconfiguration.

STEP trigger. The STEP trigger triggers a single execution of the configured command by the target cell that is in the WAIT status.

STOP trigger. The STOP trigger stops the target cell by setting the cell in the STOP status.

Due to the possibility of indicating in the processing cell in which register of the target cell the result is to be entered and which type of trigger signal is to be generated, a quantity of management data can be generated from a data stream. This management data is not a result of the actual task to be processed by the chip, but instead serves only the function of management, synchronization, optimization, etc. of the internal status.

Each cell can assume the following states, which are represented by appropriate coding in the status register:

READY. The cell has been configured with a valid command and can process data. Processing takes place with each clock cycle. The data is entered into the register of the target cell on the basis of the addressing type of the cell sending the data.

WAIT. The cell has been configured with a valid command and can process data. Processing takes place in part on the basis of a trigger signal which can be generated by other elements of the unit. The data is entered into the register of the target cell on the basis of the addressing type of the cell sending the data.

CONFIG. The cell has not been configured with a valid command. The data packet which is sent to the cell with the next clock cycle is entered into the command register. The data packet is in any case entered into the command register, regardless of which addressing type has been used by the cell sending the data.

CONFIG WAIT. The cell has not been configured with a valid command. A data packet is entered with the next trigger signal which can be generated by other elements of the unit and can be written to the command register. The data packet is entered into the command register in any case, regardless of which addressing type has been used by the cell sending the data.

RECONFIG. The cell has been configured with a valid command, but it is not processing any data at the moment. The data is accepted by the cell (transferred to the input register) but is not processed further.

STOP. The cell is configured with a valid command, processed, but no data so far. The data is received by the cell (transmitted to the input register) but not further processed.

Due to these various states and the possibility of read and write access to the various registers of a cell, each cell can assume an active management role. In contrast with that, all existing units of this type have a central management instance which must always know and handle the overall status of the unit.

To achieve greater flexibility, there is another class of commands which change in type after the first execution. Using the example of the ADD command, the command has the following format:

ADD-C-A. The result of the ADD function is written to the command register of the target cell with the first execution of the command. With each subsequent execution, the result is written to operand register A.

This possibility can be expanded as much as desired, so that commands of the type ADD-C-V-A-C- . . . B are also conceivable. Each command can assume all permutated combinations of the different addressing and triggering types.

Hardware expansion with respect to PACT02

Additional registers

A status register and a configuration register are added to the registers described in PACT02. Both registers are triggered by the PLU bus and they have a connection to the state machine of the SM UNIT (PACT02, FIG. 2: 0213).

Change in the PLU bus

Figure 2:
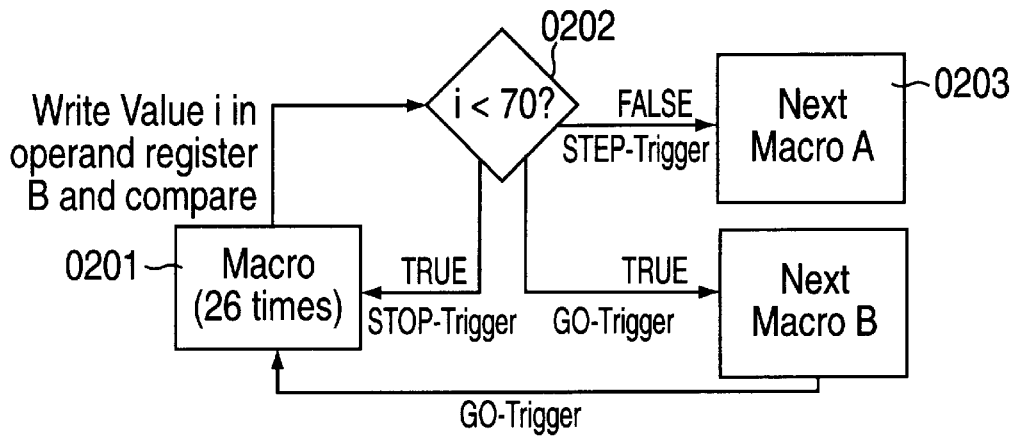

In PACT02, the configurable registers M/F-PLUREG are managed exclusively over the PLU bus (PACT02, FIG. 2: 0210). To ensure the function according to this invention, there must also be an additional possibility of access through the normal system bus (PACT02, FIG. 2: 0201). The same thing is true of the new status and configuration registers.

Only the part of the system bus that is interconnected with the PAE over the BM UNIT (PACT02, FIG. 2: 0210) is relevant for the registers. Therefore, the bus is relayed from the BM UNIT to the registers, where upstream multiplexers or upstream gates assume the switching between the PLU bus and the system bus relevant for the PAE.

The multiplexers or gates are wired so that they always switch through the system bus relevant for the PAE except after a reset of the unit (RESET) or when the ReConfig signal (PACT02, FIG. 3: 0306) is active.

Expansion of the system bus

The system bus (PACT02, FIG. 2: 0201) is expanded to the extent that the information about the target register is transmitted together with the data. This means that an address which selects the desired register at the data receiver is also sent at the same time.

BRIEF DESCRIPTION OF THE DIAGRAMS

FIG. 1: This figure shows how a loop construct can be implemented by using triggers.

FIG. 2: This figure shows how a comparator construct can be implemented by using multiple triggers.

Figure 3:
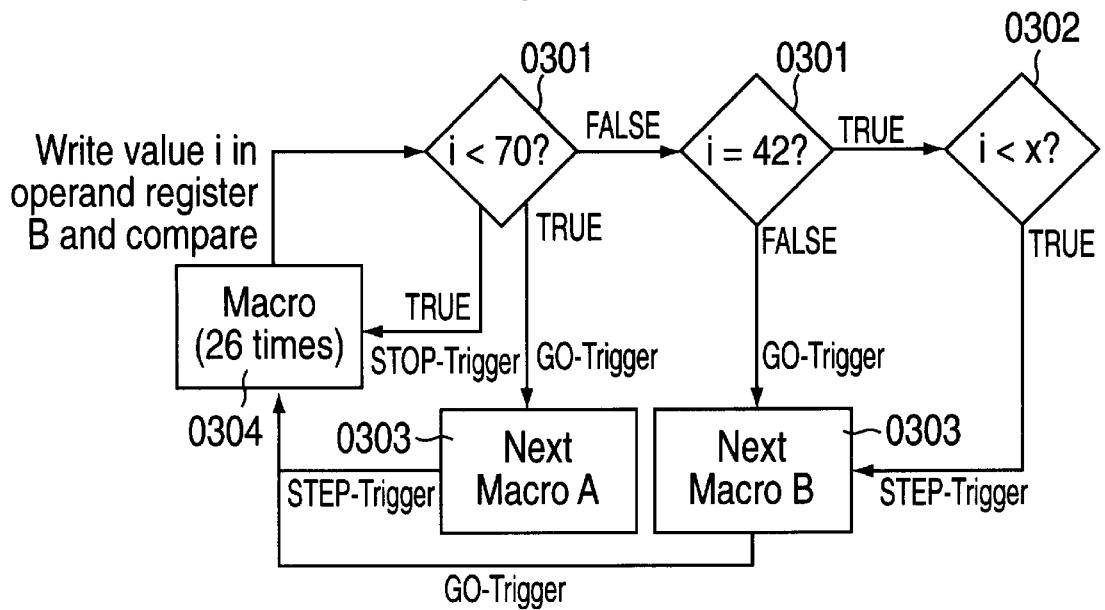

FIG. 3: This figure shows how a comparator construct with multiple outputs can be implemented by using multiple triggers and interleaving them.

Figure 4:
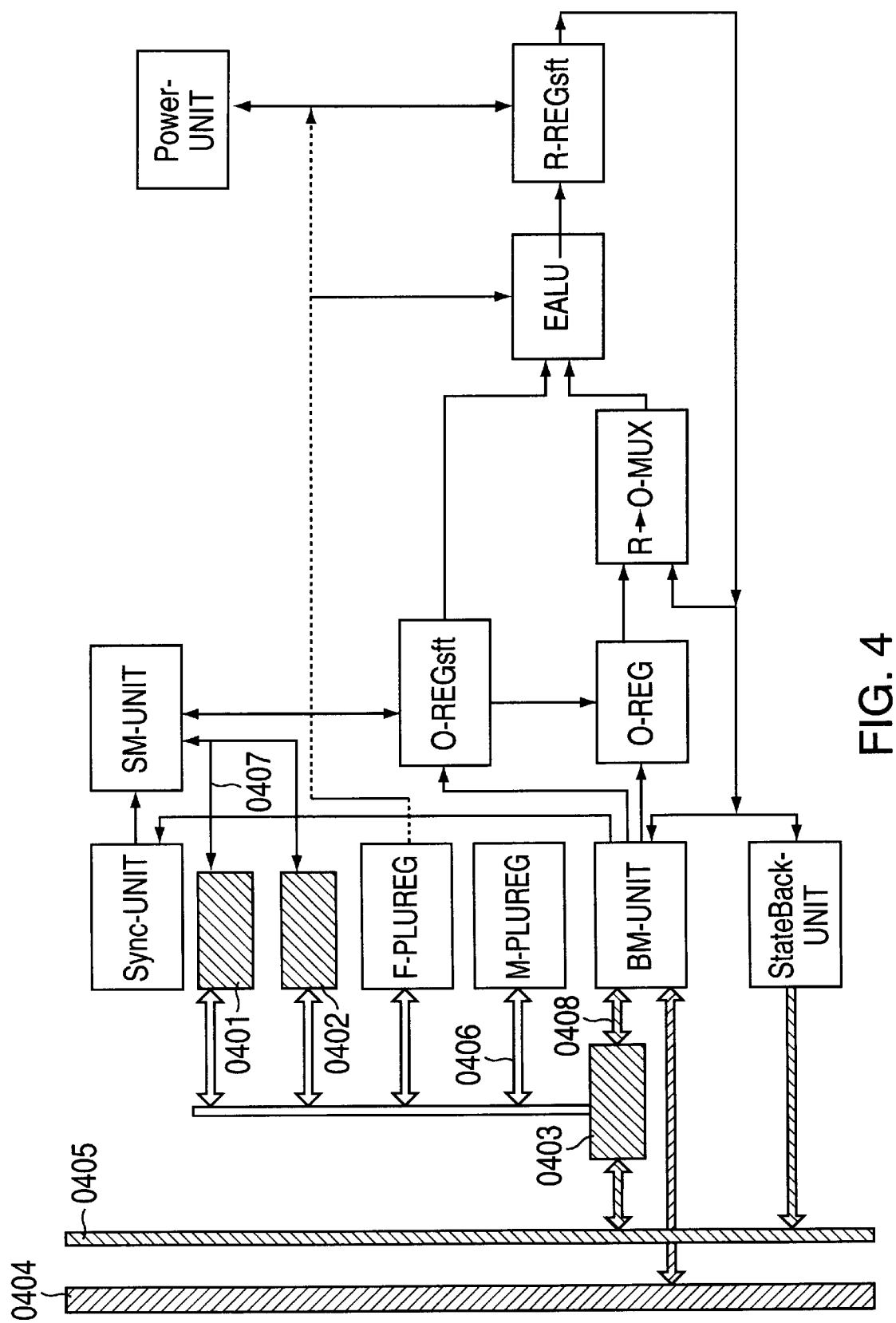

FIG. 4: This shows the required extensions in comparison with PACT02.

DETAILED DESCRIPTION OF THE DIAGRAMS AND EMBODIMENTS

FIG. 1. Macro 0103 will be executed 70 times in this example. Execution of the macro once requires 26 clock cycles. This means that counter 0101 may be decremented by one only once in every 26 clock cycles. One problem with freely programmable units is that it is not always possible to guarantee that the execution of macro 0103 is actually concluded after 26 cycles. A delay can occur, for example, due to the fact that a macro which is supposed to deliver input data for macro 0103 suddenly needs ten clock cycles longer. For this reason, the cell in macro 0103 sends a trigger signal to counter 0101 by means of which the result of the computation is sent to another macro. At the same time, processing of macro 0103 is stopped by the same cell. This cell "knows" exactly that the condition for termination of a computation has been reached.

The trigger signal sent in this case is a STEP trigger which causes counter 0101 to execute its configured function once. The counter decrements its count by one and compares whether it has reached the value zero. If this is not the case, a GO trigger is sent to macro 0103. This GO trigger signal causes macro 0103 to resume its function again.

This process is repeated until counter 0101 has reached a value of zero. In this case a trigger signal is sent to macro 0102, where it triggers a function.

A very fine-grained synchronization can be achieved by this interaction of triggers.

FIG. 2 corresponds to the basic idea of FIG. 1. However, in this case the function in element 0202 is not a counter but a comparator. Macro 0201 sends a comparison value to comparator 0202 after each processing run. Depending on the output of the comparison, different triggers are again activated to cause an action in macros 0203, for example. The construct implemented in FIG. 2 corresponds to that of an IF query in a program language.

FIG. 3. As in FIG. 2, several comparators 0301, 0302 are used here to implement the construction of an IF-ELSE- ELSE construct (or a multiple choice). By using various types of triggers and connections of these triggers to macros 0303, 0304, very complex sequences can be implemented easily.

FIG. 4 shows the differences in comparison with PACT02 in FIG. 2. The differences are shown with shading. The configuration register (0401) and the status register (0402) are connected to the SM UNIT over the bus (0407). Registers 0401, 0402, F- and M-PLUREG are connected to a gate 0403 over an internal bus (0206) this connects the internal bus (0406) to the PLU bus 0405, depending on the setting, to permit configuration by the PLU, or to the BM UNIT over a bus 0408. Depending on the addressing on data bus 0404, the BM unit relays the data to the O-REG or to the addressed register 0401, 0402, F- or M-PLUREG.

Definition of terms

BM UNIT: Unit for sending data on the bus systems outside the PAE. The data is sent over multiplexers for the data inputs and gates for the data outputs. oACK lines are implemented as open-collector drivers. The BM UNIT is controlled by the M-PLUREG.

Data receiver: The unit(s) that further process(es) the results of the PAE.

Data transmitter: The unit(s) that make(s) data available for the PAE as operands.

Data string: A data string consists of a bit sequence of any length. This bit sequence is a processing unit for a system. Commands for processors and similar units as well as strictly data can be coded in a data string.

DFP: Data flow processor according to (unexamined) German Patent DE 44 16 881.

DPGA: Dynamically programmable gate array. Known.

EALU: Expanded arithmetic and logic unit. An ALU that has been expanded by adding special functions that are needed or appropriate for operation of a data processing system according to German Patent DE 441 16 881 A1. These are counters in particular.

Elements: Collective term for all types of self-contained units which are used as one piece in an electronic unit. Elements are thus:
  Configurable cells of all types
  Clusters
  RAM blocks
  Logic units
  ALUs
  Registers
  Multiplexers
  I/O pins of a chip Event: An event can be analyzed by a hardware element in any appropriate manner for the application and it can trigger a conditional action as a response to this analysis. Events are thus, for example:
  Clock cycle of a data processing system,
  Internal or external interrupt signal,
  Trigger signal from other elements within the unit,
  Comparison of a data stream and/or a command stream with a value,
  Input/output events,
  Running, overrunning, resetting, etc. a counter,
  Analysis of a comparison.

FPGA: Field-programmable gate array. Known.

F-PLUREG: Register in which the function of the PAEs is set. Likewise, the one-shot and sleep modes are set. The PLU writes into the register.

H level: Logic 1 level, depending on the technology used.

Configurable element: A configurable element is an element of a logic unit which can be set by a configuration string for a specific function. Configurable elements are thus all types of RAM cells, multiplexers, arithmetic and logic units, registers and all types of internal and external interconnection description, etc.

Configurable cell: See logic cells.

Configure: Setting the function and interconnection of a logic unit, a (FPGA) cell or a PAE (see reconfigure).

Configuration data: Any quantity of configuration strings.

Configuration memory: The configuration memory contains one or more configuration strings.

Configuration string: A configuration string consists of a bit sequence of any length. This bit sequence represents a valid setting for the element to be configured, so the result is a functional unit.

Primary logic unit: Unit for configuring and reconfiguring the PAE. Embodied by a microcontroller adapted specifically to its task.

Logic cells: Configurable cells used in DFPs, FPGAs, DPGAs which fulfill simple logical or arithmetic tasks according to their configuration.

L level: Logic 0 level, depending on the technology used.

M-PLUREG: Register in which the interconnection of the PAEs is set. The register is written by the PLU.

O-REG: Operand register for storing the operands of the EALU. Permits chronological and functional independence of the PAEs from the data transmitters. This simplifies the transfer of data because it can take place asynchronously or packet-oriented. At the same time, this creates the possibility of reconfiguring the data transmitters independently of the PAEs or reconfiguring the PAEs independently of the data transmitters.

PLU: Unit for configuring and reconfiguring the PAEs. Embodied by a microcontroller adapted specifically to its function.

SM UNIT: State machine UNIT. State machine that controls an EALU.

Switching table: A switching table is a ring memory which is addressed by a control. The entries in a switching table may contain any configuration strings. The control can execute commands. The switching table responds to trigger signals and reconfigures the configurable elements on the basis of an entry in a ring memory.

Reconfigure: Reconfiguring any quantity of PAEs while any remaining quantity of PAEs continue their own functions (see configure).

Processing cycle: A processing cycle describes the period of time needed by a unit to go from a defined and/or valid state to the next defined and/or valid state.

Cells: Synonym for configurable elements.

Conventions

Naming conventions

Subassembly: UNIT
Operating mode: MODE
Multiplexer: MUX
Negated signal: not
Register for PLU visible: PLUREG
Register internal: REG
Shift registers: sft Function convention AND function &

| A | B | Q |
|---|---|---|
| 0 | 0 | 0 |
| 0 | 1 | 0 |
| 1 | 0 | 0 |
| 1 | 1 | 1 |

OR function #

| A | B | Q |
|---|---|---|
| 0 | 0 | 0 |
| 0 | 1 | 1 |
| 1 | 0 | 1 |
| 1 | 1 | 1 |

NOT function !

| A | Q |
|---|---|
| 0 | 1 |
| 1 | 0 |

GATE function G

| EN | D | Q |
|----|---|---|
| 0  | 0 | - |
| 0  | 1 | - |
| 1  | 0 | 0 |
| 1  | 1 | 1 |

What is claimed is:

1. A method of synchronizing configurable elements of a data processing unit, the data processing unit having a multi-dimensional cell architecture, comprising:
   transmitting in a network a status signal by a first element of the configurable elements to at least one second element of the configurable elements during a run-time state of the data processing unit and while at least another element of the configurable elements processes data, the status signal indicating an internal state of the first element;
   receiving the status signal by the at least one second element; and
   processing data by the at least one second element as a function of the received status signal.

2. The method of claim 1, wherein the internal state is an output of a comparator.

3. The method of claim 1, wherein the processing data step comprises the step of:
   performing processing steps after receiving the status signal until a further status signal is received.

4. The method of claim 3, wherein the further status signal has a semantic of a STOP, receipt of the STOP ending the performance of the processing steps.

5. The method of claim 1, wherein each of the configurable elements includes a plurality of status information inputs.

6. The method of claim 5, wherein each of the plurality of status information inputs are capable of being enabled and disabled.

7. A method of synchronizing configurable elements of a data processing unit, the data processing unit having a multi-dimensional cell architecture, comprising:
   transmitting in a network a status signal by a first element of the configurable elements to at least one second element of the configurable elements, the status signal indicating an internal state of the first element, the internal state being one of an underflow flag signal and an overflow flag signal from at least one of an adder and a subtractor;
   receiving the status signal by the at least one second element; and
   processing data by the at least one second element as a function of the received status signal.

8. A method of synchronizing configurable elements of a data processing unit, the data processing unit having a multi-dimensional cell architecture, comprising:
   transmitting in a network a status signal by a first element of the configurable elements to at least one second element of the configurable elements, the status signal indicating an internal state of the first element, the internal state being one of a zero flag signal and an equal flag signal from at least one of an adder and a subtractor;
   receiving the status signal by the at least one second element; and
   processing data by the at least one second element as a function of the received status signal.

9. A method of synchronizing configurable elements of a data processing unit, the data processing unit having a multi-dimensional cell architecture, comprising:
   transmitting in a network a status signal by a first element of the configurable elements to at least one second element of the configurable elements, the status signal indicating an internal state of the first element, the internal state being a negative flag signal from at least one of an adder and a subtractor;
   receiving the status signal by the at least one second element; and
   processing data by the at least one second element as a function of the received status signal.

10. A method of synchronizing configurable elements of a data processing unit, the data processing unit having a multi-dimensional cell architecture, comprising:
    transmitting in a network a status signal by a first element of the configurable elements to at least one second element of the configurable elements, the status signal indicating an internal state of the first element, the internal state being a carry signal from at least one of an adder and a subtractor;
    receiving the status signal by the at least one second element; and
    processing data by the at least one second element as a function of the received status signal.

11. A method of synchronizing configurable elements of a data processing unit, the data processing unit having a multi-dimensional cell architecture, comprising:
    transmitting in a network a status signal by a first element of the configurable elements to at least one second element of the configurable elements, the status signal indicating an internal state of the first element, the internal state being a flag from an arithmetic logic unit;
    receiving the status signal by the at least one second element; and
    processing data by the at least one second element as a function of the received status signal.

12. A method of synchronizing configurable elements of a data processing unit, the data processing unit having a multi-dimensional cell architecture, comprising:
    transmitting in a network a status signal by a first element of the configurable elements to at least one second element of the configurable element, the status signal indicating an internal state of the first element, the status signal being a trigger signal;
    receiving the status signal by the at least one second element; and processing data by the at least one second element as a function of the received status signal.

13. A method of synchronizing configurable elements of a data processing unit, the data processing unit having a multi-dimensional cell architecture, comprising:

transmitting in a network a status signal by a first element of the configurable elements to at least one second element of the configurable elements, the status signal indicating an internal state of the first element;

receiving the status signal by the at least one second element; and processing data by the at least one second element as a function of the received status signal, the processing data step including the step of performing only one processing step after receiving the status signal.

14. A method of of synchronizing configurable elements of a data processing unit, the data processing unit having a multi-dimensional cell architecture, comprising:

transmitting in a network a status signal by a first element of the configurable elements to at least one second element of the configurable elements, the status signal indicating an internal state of the first element;

receiving the status signal by the at least one second element;

processing data by the at least one second element as a function of the received status signal; and transmitting an acknowledgment signal by the at least one second element after receiving the status signal.

15. A method of synchronizing configurable elements of a data processing unit, the data processing unit having a multi-dimensional cell architecture, comprising:

processing first data by at least one first element of the configurable elements;

transmitting in a network a status signal by a second element of the configurable elements to the at least one first element of the configurable elements, the status signal indicating an internal state of the second element;

receiving the status signal by the at least one first element; and halting processing the first data by the at least one first element upon receiving the status signal.

16. The method of claim 15, further comprising the step of:

setting the at least one first element into a reprogrammable state upon receiving the status signal.

* * * * *